Patented Dec. 23, 1941

2,266,879

UNITED STATES PATENT OFFICE 2,266,879

DYESTUFF OF THE BENZANTHRONYL-AMINO-ANTHRAQUINONE ACRIDINE SERIES

William Hiram Lycan, Milwaukee, Wis., assignor to E. I. du Pont de Nemours & Company, Wilmington, Del., a corporation of Delaware No Drawing. Application April 25, 1940, Serial No. 331,594

1 Claim. (Cl. 260—274)

This invention relates to the preparation of new and valuable gray to olive dyestuffs of the benzanthronylamino - anthraquinoneacridine series and more particularly to the preparation of the new dyestuffs produced by the alkali fusion of the compounds of the general formula:

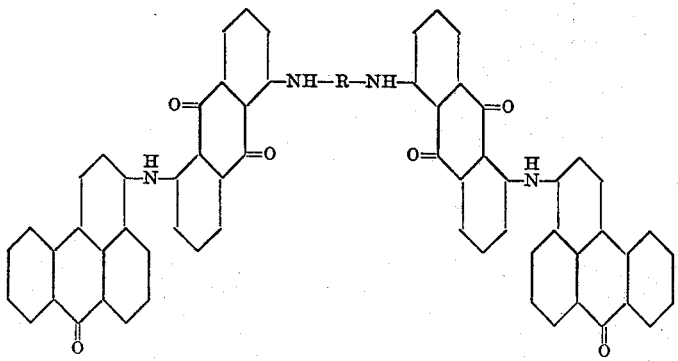

in which R represents an isocyclic or heterocyclic radical.

These alkali fused compounds dye in gray shades and after treatment with concentrated sulfuric acid dye in more greenish shades.

Since the original production of the dyestuff of U. S. P. 995,936 which is generally considered to have the formula:

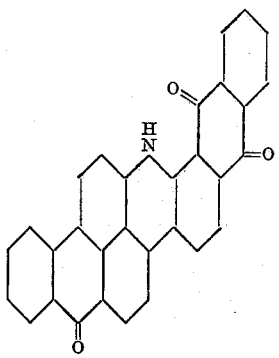

and which dyes in olive green shades, a large number of compounds have been produced of this series which in the main exhibit good fastness properties. The simple addition of arylamino groups to the anthraquinone or the benzanthrone nucleus of the above formulated olive green dyestuff does not in all cases produce dyestuffs with sufficient tinctorial power to make them commercially useful. It is recognized that the shade of the olive green dyestuff of the original patent can be altered by the addition of substituents, but the nature and position of the substituents is a real factor in determining the dyeing properties of the resulting product. It has been found that the simple addition of an arylamino group such as a phenylamino radical in the 5-position of the anthraquinone molecule of the basic nucleus as above formulated gives a dyestuff which does not have good tinctorial power. In a like manner, other substituents have also been added without producing satisfactory dyestuffs.

It has now been found that new and valuable dyestuffs varying in shade from those heretofore produced both in the olive and gray range can be prepared by condensing one mole of 1,5-diamino anthraquinone with one mole of Bz-1-bromo-benzanthrone under the usual conditions, such as in a high boiling organic solvent and in the presence of an acid binding agent and a copper salt, and then condensing this intermediate product in a ratio of two moles with one mole of a dihalogen isocyclic or heterocyclic compound. The resulting compounds are then fused with alkali, preferably alcoholic caustic, at temperatures of 135–175° C. These dyestuffs after isolation dye cotton from the usual hydrosulphite vat in gray shades. On sulfuric acid treatment of these colors, they give dyestuffs which dye in more greenish shades and exhibit increasing tinctorial strength.

As illustrative of the various dibromo-isocyclic or heterocyclic compounds which may be employed to give the dyestuff of this invention may be mentioned:

Dibromo-benzene
Dibromo-diphenyl
Dibromo-diphenyloxide
Dibromo-diphenyleneoxide
Dibromo-benzophenone
Dibromo-naphthalene
Dibromo-fluorenone
Dibromo-phenanthrene These compounds are mentioned merely to illustrate the scope of applicant's invention, it being understood that other dihalogen compounds may be employed in the same manner to produce dyestuffs having similar properties to those obtained when the above specific compounds are employed.

The following examples are given to illustrate the invention more fully. The parts used are by weight.

Example 1

26.3 parts of Bz-1-bromobenzanthrone, 20 parts of 1:5-diaminoanthraquinone, 20 parts of sodium acetate and 0.4 part of copper acetate are heated in 400 parts of naphthalene to 200° C. for eight hours. After cooling the mass to 180°, 14.2 parts of 2:7-dibromofluorenone and 10 parts of sodium acetate are added and the condensation completed at reflux temperature for 12 hours. The mass is cooled, diluted with ortho-dichloro-benzene, filtered hot, washed free from solvent and inorganic salts and dried. The yield is about 90% of theory of a compound which has the formula:

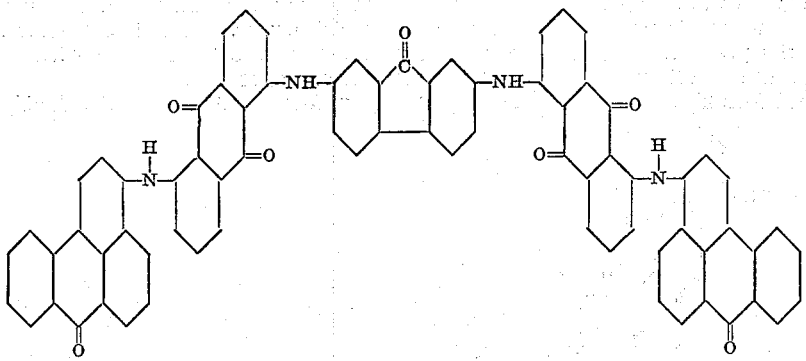

40 parts of this anthrimide are introduced into a melt of 100 parts methanol and 200 parts caustic potash at 135–140° C. The temperature of the fusion is raised to 145–150° C. and maintained for one hour. The fusion mass is then drowned in water, the color is precipitated by aeration, then filtered, washed and dried.

The new dyestuff is a dark powder which dissolves in concentrated $H_2SO_4$ with green color and dyes cotton from a violet-blue vat in blue-gray shades.

Example 2

If in the anthrimide condensation of Example 1, the dibromo-fluorenone is replaced by 13.8 parts para-para'-dibromo-diphenyloxide an anthrimide is obtained which upon methanolic caustic fusion yields a bluish-gray dyestuff on cotton from a violet vat. Treatment of this product with concentrated sulfuric acid in which it dissolves with green color results in an olive-green dyestuff of exceptional fastness properties.

Example 3

26.3 parts of Bz-1-bromo-benzanthrone are condensed with 20 parts 1:5-diamino-anthraquinone in presence of 20 parts soda ash and 0.5 part cuprous chloride in 300 parts nitrobenzene at 200° C. for 6 hours. Then 13.4 parts para-para'-dibromo-diphenyl are added and the heating continued at 210° C. for 20 hours. The mass is cooled, filtered and washed free from solvent and inorganic salts.

20 parts of this anthrimide are fused with 100 parts caustic potash and 50 parts methyl alcohol at 145°–150° C. for 1 hour. The fusion is diluted with water and the dyestuff separated out by air oxidation. After filtration, washing and drying it appears as a black powder soluble in concentrated sulfuric acid with green color and dyeing from a violet vat in blue gray shades.

Example 4

If in Example 3 the dibromo-diphenyl is replaced by para-dibromo-benzene (10 parts) a similar dyestuff is obtained which on treatment with concentrated sulfuric acid yields a very fast olive-green from a violet vat.

While the exact structural formula of the dyestuff produced on the alkaline fusion of the products as formulated above is not known it is assumed that ring closure takes place between the benzanthrone and the aminoanthraquinone radicals to give an acridine nucleus and also that ring closure takes place between the aminoanthraquinone radicals and the aromatic radical designated R to give carbazole rings. However, it is to be understood that in dyestuffs of high molecular weight such as those disclosed in this application the structural formulas are of necessity only crude portrayals of what the actual structure of the molecule must be and that any formula employed to designate such products is used not as the actual constitution of the dyestuffs but to characterize the compounds produced from the particular intermediates disclosed.

I claim:

The dyestuff obtained by the caustic alkali fusion of the compound of the formula:

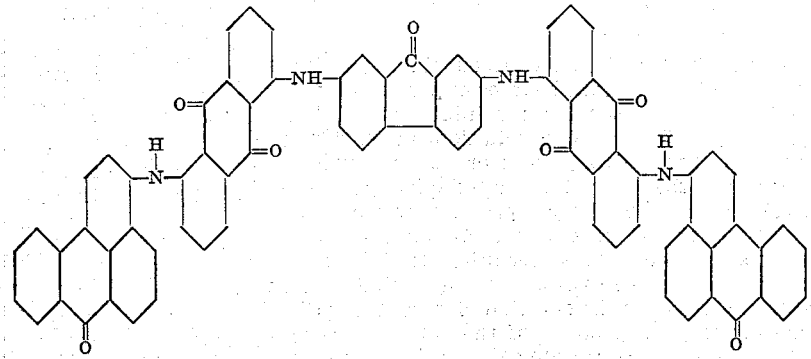

WILLIAM HIRAM LYCAN.